United States Patent
Sun et al.

(10) Patent No.: US 9,042,614 B2
(45) Date of Patent: May 26, 2015

(54) IMAGE REGISTRATION METHOD

(75) Inventors: Yiyong Sun, Shanghai (CN); Jingjing Gong, Shanghai (CN); Daozhi Liu, Shanghai (CN)

(73) Assignee: SHANGHAI MICROPORT EP MEDTECH CO., LTD., Pudong New District, Shanghai (CN)

( * ) Notice: Subject to any disclaimer, the term of this patent is extended or adjusted under 35 U.S.C. 154(b) by 157 days.

(21) Appl. No.: 13/814,760

(22) PCT Filed: Aug. 11, 2011

(86) PCT No.: PCT/CN2011/078267
§ 371 (c)(1),
(2), (4) Date: Mar. 1, 2013

(87) PCT Pub. No.: WO2012/028053
PCT Pub. Date: Mar. 8, 2012

(65) Prior Publication Data
US 2013/0156281 A1   Jun. 20, 2013

(30) Foreign Application Priority Data
Aug. 31, 2010   (CN) .......................... 2010 1 0270148

(51) Int. Cl.
G06K 9/00     (2006.01)
G06T 7/00     (2006.01)
G06K 9/62     (2006.01)
G06T 3/00     (2006.01)

(52) U.S. Cl.
CPC ............ *G06K 9/0014* (2013.01); *G06T 7/0028* (2013.01); *G06T 2207/10072* (2013.01); *G06T 2207/10136* (2013.01); *G06K 9/6206* (2013.01); *G06T 3/0068* (2013.01)

(58) Field of Classification Search
None
See application file for complete search history.

(56) References Cited

U.S. PATENT DOCUMENTS 7,177,486 B2 *   2/2007   Stewart et al. ................. 382/294
2006/0159323 A1 *   7/2006   Sun et al. ....................... 382/128
(Continued)

FOREIGN PATENT DOCUMENTS

CN     1489101 A     4/2004
CN     1818974 A     8/2006

OTHER PUBLICATIONS

International Search Report for Application No. PCT/CN2011/078267 dated Oct. 20, 2011 (2 pages).

*Primary Examiner* — Bhavesh Mehta
*Assistant Examiner* — Oneal R Mistry
(74) *Attorney, Agent, or Firm* — Michael Best & Friedrich LLP (57) ABSTRACT

The present application relates to an image registration method, comprising: selecting a registration source image $\{p_i\}$ and a registration target image $\{q_j\}$; applying a random perturbation to $\{p_i\}$ in accordance with a preset random perturbation control parameter σ so that it is deformed to obtain $\{p_i'\}$, and obtaining a set of closest points, i.e., $\{g_j'\}$, on $\{q_j\}$ corresponding to points on $\{p_i'\}$; performing an iterative operation on $\{p_i'\}$ and $\{q_j'\}$ in accordance with a preset initial coordinate transformation $H_0$ to obtain a coordinate transformation $\{H_1\}$, $0<l<=L$, between $\{p_i'\}$ and $\{q_i'\}$, and calculating an average distance $\{E_1\}$ corresponding to the coordinate transformation $\{H_1\}$ in accordance with the coordinate transformation $\{H_1\}$; judging magnitudes of the average distance $\{E_1\}$ and a preset ideal average distance $E_x$, and terminating the registration when the average distance $\{E_1\}$ is smaller than or equal to the preset ideal average distance.

10 Claims, 5 Drawing Sheets

(56) References Cited

U.S. PATENT DOCUMENTS

| | | |
|---|---|---|
| 2008/0137949 A1* | 6/2008 | Zouhar et al. ................. 382/168 |
| 2008/0240574 A1* | 10/2008 | Weon Geun et al. ......... 382/201 |
| 2009/0046951 A1 | 2/2009 | Paragios et al. |
| 2011/0116698 A1* | 5/2011 | Weis et al. .................... 382/131 |
| 2013/0345555 A1* | 12/2013 | Kanade et al. ................ 600/424 |

* cited by examiner

IMAGE REGISTRATION METHOD

CROSS-REFERENCE TO RELATED APPLICATIONS

This application is a national stage filing under 35 U.S.C. 371 of International Application No. PCT/CN2011/078267 filed Aug. 11, 2011, which claims foreign priority benefits to Chinese Patent Application No. 201010270148.9 filed Aug. 31, 2010. These applications are incorporated herein by reference in their entirety.

TECHNICAL FIELD

The present application relates to the image processing technical field, and in particular, to an image registration method based on ICP algorithm.

BACKGROUND ART

Along with continuous emergence of new types of sensors, the ability of people to obtain images is improved rapidly, and images generated by sensors of different physical characteristics are also increased continuously. Since image data obtained by different image sensors have obvious limitations and differences, merely using one kind of image data generally can hardly meet actual requirements. Therefore, there is a need to combine images obtained by different sensors via an image fusion technique to achieve more comprehensive, clearer and more accurate understanding and recognition of targets in the images. For example, in medical science, images obtained in different forms, e.g., computed tomography imaging (CT), magnetic resonance imaging (MRI), and ultrasound (US), by a comprehensive analysis of anatomic and physiological information are fused to realize an improved diagnosing process.

The image registration technique is an important precondition for achieving the image fusion, and is a problem to be firstly solved for the image fusion. The ICP (Iterative Closest Point) algorithm is a method for achieving a registration of images, and the ICP algorithm is a process of repeatedly performing "determination of a set of corresponding points, and calculation of an optimal rigid change" based on a registration method of a curved surface in a free form, until a preset registration convergence criteria is reached, the final coordinate change being a composition of respective changes. However, since the disadvantages that the initial deviation range of the registration target and the registration source cannot be too large, and although the convergence can be made to a local limit, a global optimization generally cannot be achieved (i.e., failing to get rid of the local limit) exist in the conventional ICP algorithm, accuracy and success rate of the image registration are comparatively low, which cannot meet actual requirements.

Upon a study of the prior art, the applicant finds that the existing image registration method based on the ICP algorithm generally employs two methods, i.e., "applying a random rigid perturbation transformation to a registration" and "applying a random perturbation to three-dimensional coordinate points of a registration target so that it is deformed", to achieve the object of getting rid of the local limit of the conventional ICP algorithm to make the registration effect better. However, the employment of the method of "applying a random rigid perturbation transformation to a registration" requires sampling in a space with six-dimensional freedom, needs a large amount of calculations, and takes time. With respect to the employment of the method of "applying a random perturbation to three-dimensional coordinate points of a registration target to deform it", the parameters thereof are set empirically in actual applications in accordance with different experimental models, and with regard to different experimental models, the setting of parameters is comparatively difficult, and a wrong setting is likely to result in an unsuccessful registration.

SUMMARY OF THE INVENTION

In view of the above, the embodiments of the present application provide an image registration method to achieve the object of achieving registration under a circumstance where a registration source and a registration target are in a large range of initial deviations, and effectively getting rid of bondage of local limits to improve registration accuracy and registration success rate without manual adjustment of parameters.

In order to achieve the above object, the present application employs the following technical solutions:

An image registration method, comprising:

selecting a registration source image $\{p_i\}$ and a registration target image $\{q_j\}$, wherein $0<i<=M$, $0<j<=N$, i, j, M and N are positive integers, and $M<<N$;

applying a random perturbation to the image $\{p_i\}$ in accordance with a preset random perturbation control parameter a so that it is deformed to obtain an image $\{p_i'\}$, and obtaining closest points on the image $\{q_j\}$ corresponding to points on the image $\{p_i'\}$, the obtained set of points being an image $\{q_i'\}$;

performing an iterative operation on the image $\{p_i'\}$ and the image $\{q_i'\}$ within a preset step length L in accordance with a preset initial coordinate transformation $H_0$ to obtain a coordinate transformation $\{H_1\}$, $0<l<=L$, between the image $\{p_i'\}$ and the image $\{q_i'\}$, and calculating an average distance $\{E_1\}$ corresponding to the coordinate transformation $\{H_1\}$ in accordance with the coordinate transformation $\{H_1\}$;

judging magnitudes of the average distance $\{E_1\}$ and a preset ideal average distance $E_x$, and terminating the registration when the average distance $\{E_1\}$ is smaller than or equal to the preset ideal average distance.

Preferably, the $p_i$ and $q_j$ are column vectors of 3*1.

Preferably, said obtaining closest points on the image $\{q_j\}$ corresponding to points on the image $\{p_i'\}$ is specifically:

searching for the closest points on the image $\{q_j\}$ corresponding to the points on the image $\{p_i'\}$ by means of KD binary tree.

Preferably, said judging the magnitudes of the average distance $\{E_1\}$ and the ideal average distance $E_x$ is specifically:

judging in turn whether the average distance $\{E_1\}$ is smaller than or equal to the ideal average distance $E_x$.

Preferably, said judging the magnitudes of the average distance $\{E_1\}$ and the ideal average distance $E_x$ is specifically:

selecting the minimum average distance $E_{min}$ in the average distance $\{E_1\}$;

judging the magnitudes of the minimum average distance $E_{min}$ and the ideal average distance E.

Preferably, the method, when the average distance $\{E_1\}$ is larger than the preset ideal average distance, further comprises steps of:

judging in turn the magnitudes of the average distance $\{E_1\}$ and an initial average distance $E_0$, wherein the initial average distance $E_0$ is corresponding to the initial coordinate transformation $H_0$;

when any value in the average distance $\{E_1\}$ is smaller than or equal to the initial average distance $E_0$, terminating the judgment between the average distance $\{E_i\}$ and the initial average distance $E_0$, replacing the initial coordinate transformation $H_0$ with a coordinate transformation $H_g$ corresponding to a current average distance $E_g$, decaying the random perturbation control parameter σ in accordance with a fixed decaying rate, recalculating an average distance $\{E_1'\}$ in accordance with the coordinate transformation $H_g$ and the decayed random perturbation control parameter σ, and judging whether the average distance $\{E_1'\}$ is smaller than or equal to the preset ideal average distance $E_x$;

when all the values in the average distance $\{E_1\}$ are larger than the initial average distance $E_0$, after decaying the random perturbation control parameter σ in accordance with the fixed decaying rate, reapplying a random perturbation to the image $\{p_i\}$, recalculating an average distance $\{E_1''\}$ by using the initial coordinate transformation $H_0$, and judging whether the average distance $\{E_1''\}$ is smaller than or equal to the preset ideal average distance $E_x$.

Preferably, the method, when the average distance $\{E_1\}$ is larger than the preset ideal average distance, further comprises steps of:

selecting the minimum average distance $E_{min}$ in the average distance $\{E_1\}$;

judging magnitudes of the minimum average distance $E_{min}$ and the initial average distance $E_0$, wherein the initial average distance $E_0$ is corresponding to the initial coordinate transformation $H_0$;

when the minimum average distance $E_{min}$ is smaller than or equal to the initial average distance $E_0$, replacing the initial coordinate transformation $H_0$ with a coordinate transformation $H_g$ corresponding to the minimum average distance $E_{min}$, decaying the random perturbation control parameter σ in accordance with a fixed decaying rate, recalculating an average distance $\{E_1\}$ in accordance with the coordinate transformation $H_{min}$ and the decayed random perturbation control parameter σ, and judging whether the average distance $\{E_1\}$ is smaller than or equal to the preset ideal average distance $E_x$;

when the minimum average distance $E_{min}$ is larger than the initial average distance $E_0$, after decaying the random perturbation control parameter σ in accordance with the fixed decaying rate, reapplying a random perturbation to the image $\{p_i\}$, recalculating an average distance $\{E_1''\}$ by using the initial coordinate transformation $H_0$, and judging whether the average distance $\{E_1''\}$ is smaller than or equal to the preset ideal average distance $E_x$.

Preferably, the method, after said recalculating an average distance $\{E_1'\}$ or said recalculating an average distance $\{E_1''\}$, further comprises:

judging whether a number of iteration times is larger than a preset number of iteration times K, and terminating the registration and reporting an error when the number of iteration times is larger than the preset number of iteration times K.

Preferably, the fixed decaying rate of the random perturbation control parameter σ is $$\frac{1}{\sqrt{2}}.$$

Preferably, the step length L is in a range of 50-200.

It can be seen from the above technical solutions provided in the embodiments of the present application that the random perturbation control parameter σ in this method can be decayed automatically in the whole iteration process. When the preset initial transformation is at the optimal starting position, there is no need to worry about a transformation of the model to a worse position due to adding the random perturbation, and when the initial transformation itself is not optimal, the model can be made to get rid of the bondage of local limits so as to be transformed to a better position to undergo the iteration by adding the random perturbation, i.e., approaching the global optimization by searching. Meanwhile, the random perturbation control parameter σ in this method is not set empirically but is comprehensively set after a consideration of the global search performance and the iteration speed. With regard to multiple groups of cardiac chamber models, the random perturbation control parameters σ can be set to the same value and all obtain a comparatively good registration effect.

Therefore, the image registration method provided in the embodiments of the present application can not only achieve registration under a circumstance where a registration source and a registration target are in a large range of initial deviations, but also effectively get rid of bondage of local limits to improve registration accuracy and registration success rate without manual adjustment of parameters.

BRIEF DESCRIPTION OF THE DRAWING

In order to describe more clearly the technical solutions of the embodiments of the present application or the prior art, brief description of the accompanying figures to be used in the descriptions of the embodiments or the prior art will be given below. Obviously, the figures in the descriptions below are only some embodiments recorded in the present application, and those skilled in the art can obtain other figures in accordance with these figures without making creative efforts.

DETAILED DESCRIPTION OF THE INVENTION

Embodiments

In order for those skilled in the art to understand the technical solutions in the present application better, clear and complete descriptions of the technical solutions in the embodiments of the present application will be given below by referring to the figures in the embodiments of the present application. Obviously, the described embodiments are only parts of the embodiments of the present application, rather than all of the embodiments. Based on the embodiments in the present application, all other embodiments obtained by those skilled in the art without making creative efforts shall belong to the protection scope of the present application.

Embodiment 1

Figure 1:
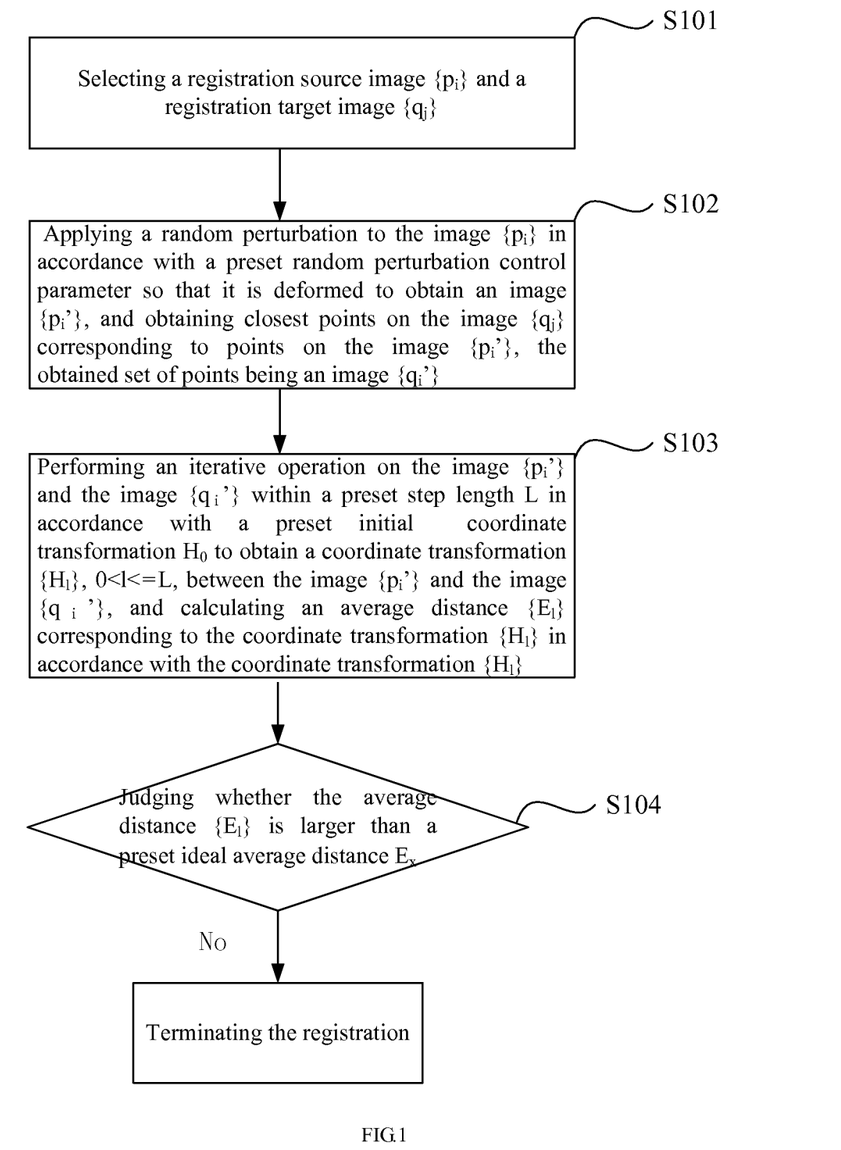
FIG. 1 is a schematic diagram of a flow of an image registration method provided in Embodiment 1 of the present application.

FIG. 1 is a schematic diagram of a flow of an image registration method provided in Embodiment 1 of the present application.

As shown in FIG. 1, the method comprises:

Step S101: selecting a registration source image $\{p_i\}$ and a registration target image $\{q_j\}$, the registration source image being $\{p_i|i=1,\ldots,M\}$, the registration target image being $\{q_j|j=1,\ldots,N\}$, M<<N, the registration source image $\{p_i\}$ and the registration target image $\{q_j\}$ being located in different coordinate systems, and $\{p_i\}=H*\{q_j\}$ $$H = \begin{bmatrix} R & 0 \\ T & 1 \end{bmatrix},$$

wherein 0<i<=M, 0<j<=N, i, j, M and N are positive integers, and M<<N; R is a rotation matrix of 3*3, and T is a translation vector of 3*1.

Step S102: applying a random perturbation to the image $\{p_i\}$ to deform it in accordance with a preset random perturbation control parameter $\sigma$ so as to obtain an image $\{p_i'\}$, and obtaining closest points on the image $\{q_i\}$ corresponding to points on the image $\{p_i'\}$, the obtained set of points being an image $\{q_i'\}$.

Firstly applying the random perturbation to the registration source image $\{p_i\}$, specifically:

adding a random perturbation $n_i$ that meets normal distribution with (0, $\sigma^2$) to each point in the registration source image $\{p_i\}$, so that the registration source image $\{p_i\}$ is deformed, i.e., $p_i'=p_i+n_i$, wherein $n_i$ is a column vector of 3*1.

Then searching for closest points on the registration target image $\{q_j|j=1,\ldots,N\}$ corresponding to the points on the deformed registration source image $\{p_i'|,\ldots,M\}$ by means of KD binary tree, the set of points obtained by searching being $\{q_i'|i=1,\ldots,M\}$; and calculating a matrix X of 3*3 in accordance with $$X = \sum_{i=1}^{M} q_i''(p_i'')^t,$$

and performing singular value decomposition in accordance with $X=UDV^t$, wherein $p_i''=p_i'-\overline{p}$, $q_i''=q_i'-\overline{q}$, $$\overline{p} = \frac{1}{M}\sum_{i=1}^{M} p_i', \quad \overline{q} = \frac{1}{M}\sum_{i=1}^{M} q_i',$$

U and V are orthogonal matrices of 3*3, and D is a diagonal matrix composed of singular values.

Finally respectively calculating the rotation matrix R and the translation vector T, wherein $$R=VU^t, T=\overline{p}-R\overline{q}.$$

Step S103: performing an iterative operation on the image $\{p_i'\}$ and the image $\{q_i'\}$ within a preset step length L in accordance with a preset initial coordinate transformation $H_0$ to obtain a coordinate transformation $\{H_1\}, 0<l<=L$, between the image $\{p_i'\}$ and the image $\{q_j'\}$ and calculating an average distance $\{E_1\}$ corresponding to the coordinate transformation $\{H_1\}$ in accordance with the coordinate transformation $\{H_1\}$;

calculating a coordinate transformation H between $\{p_i\}$ and $\{q_j\}$ in accordance with $\{p_i\}=H*\{q_j\}$, and $$H = \begin{bmatrix} R & 0 \\ T & 1 \end{bmatrix},$$

and calculating an average distance E between $\{p_i\}$ and $\{q_j\}$ in accordance with the coordinate transformation H, wherein $$E = \frac{1}{M}\sum_{i=1}^{M} \|p_i' - (Rq_i' + T)\|^2;$$

and performing an iterative operation on the image $\{p_i'\}$ and the image $\{q_j'\}$ for L times, recording the coordinate transformation $\{H_1|l=1,\ldots,L\}$ between the image $\{p_i\}$ and the image $\{q_j\}$ in the iterative process for L times, and performing a calculation in accordance with the coordinate transformation $\{H_1|l=1,\ldots,L\}$ to obtain an average distance $\{E_1|l=1,\ldots,L\}$ between the image $\{p_i\}$ and the image $\{q_i\}$, wherein 0<l<=L.

Step S104: judging whether the average distance $\{E_1\}$ is larger than a preset ideal average distance $E_x$, and if not, terminating the registration. If one value in the average distance $\{E_1\}$ is smaller than or equal to the preset ideal average distance $E_x$, this value in the average distance $\{E_1\}$ is the ideal coordinate transformation, and thus the registration can be terminated.

In the embodiment of the present application, there are two approaches to judge magnitudes of the average distance $\{E_1\}$ and the preset ideal average distance $E_x$, i.e., Approach 1: judging in turn the magnitudes of the average distance $\{E_1\}$ and the ideal average distance $E_x$, and Approach 2: selecting the minimum average distance $E_{min}$ in the average distance $\{E_1\}$, and then judging the magnitudes of the minimum average distance $E_{min}$ and the ideal average distance $E_x$.

Embodiment 2

Figure 2:
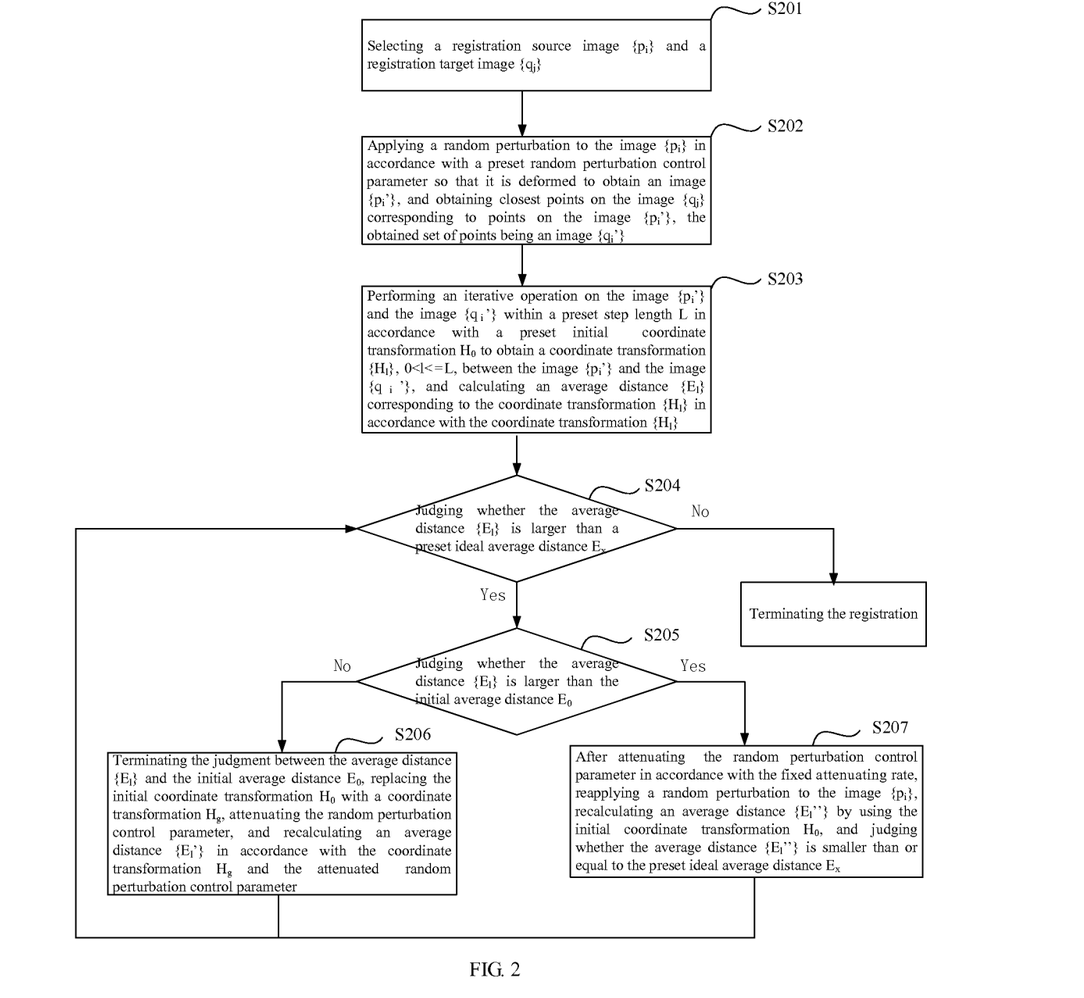
FIG. 2 is a schematic diagram of a flow of an image registration method provided in Embodiment 2 of the present application.

FIG. 2 is a schematic diagram of a flow of an image registration method provided in Embodiment 2 of the present application.

As shown in FIG. 2, step S201~step S204 in the embodiment of the present application are the same as step S101~step S104 in Embodiment 1, and no further descriptions are given herein. In step S204, if the average distance $\{E_1\}$ is larger than the preset ideal average distance $E_x$, this method can further comprise steps of:

step S205: judging in turn whether the average distance $\{E_1\}$ is larger than an initial average distance $E_0$, wherein the initial average distance $E_0$ is corresponding to the initial coordinate transformation $H_0$;

step S206: if not, terminating the judgment between the average distance $\{E_l\}$ and the initial average distance $E_0$, replacing the initial coordinate transformation $H_0$ with a coordinate transformation $H_g$ corresponding to a current average distance $E_g$, decaying the random perturbation control parameter $\sigma$ in accordance with a fixed decaying rate, recalculating an average distance $\{E_1'\}$ in accordance with the coordinate transformation $H_g$ and the decayed random perturbation control parameter $\sigma$, and judging whether the average distance $\{E_1'\}$ is smaller than or equal to the preset ideal average distance $E_x$;

step S207: if so, after decaying the random perturbation control parameter σ in accordance with the fixed decaying rate, reapplying a random perturbation to the image $\{p_i\}$, recalculating an average distance $\{E_1''\}$ by using the initial coordinate transformation $H_0$, and judging whether the average distance $\{E_1''\}$ is smaller than or equal to the preset ideal average distance $E_x$.

The global search performance and the iterative speed of the algorithm are in a reverse relationship, and the relationship between the global search performance and the iterative speed can be balanced by setting the range of the random perturbation control parameter σ and setting the step length L. In the embodiment of the present application, the preset random perturbation control parameter σ is 10% of the geometric proportion of the registration source image $\{p_i\}$ or the registration target image $\{q_j\}$, and the step length L is in a range of 50~200.

Embodiment 3

Figure 3:
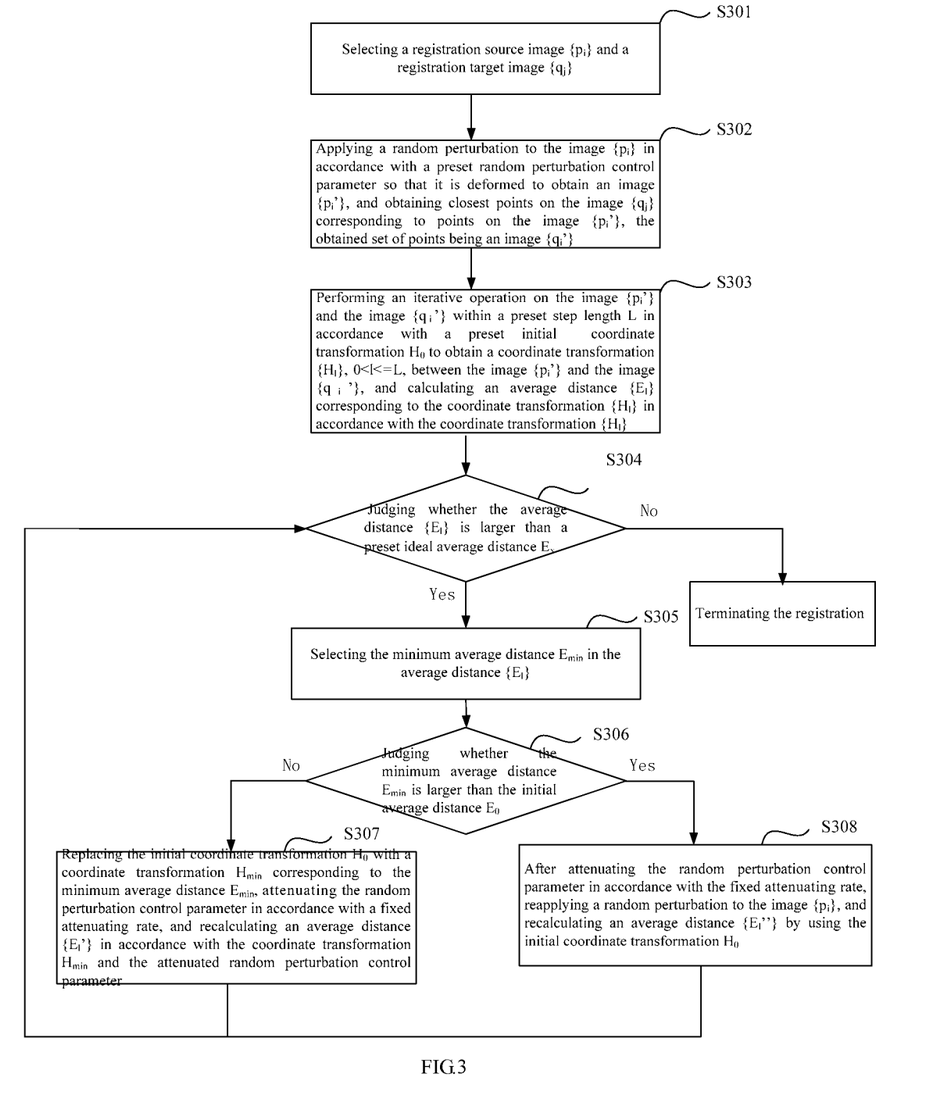
FIG. 3 is a schematic diagram of a flow of an image registration method provided in Embodiment 3 of the present application.

FIG. 3 is a schematic diagram of a flow of an image registration method provided in Embodiment 3 of the present application.

As shown in FIG. 3, step S301~step S304 in the embodiment of the present application are the same as step S101~step S104 in Embodiment 1, and no further descriptions are given herein. In step S304, after judging the magnitudes of the average distance $\{E_1\}$ and the preset ideal average distance $E_x$, this method can further comprise steps of:

step S305: selecting the minimum average distance $E_{min}$ in the average distance $\{E_1\}$;

step S306: judging whether the minimum average distance $E_{min}$ is larger than the initial average distance $E_0$, wherein the initial average distance $E_0$ is corresponding to the initial coordinate transformation $H_0$;

step S307: if not, replacing the initial coordinate transformation $H_0$ with a coordinate transformation $H_{min}$ corresponding to the minimum average distance $E_{min}$, decaying the random perturbation control parameter σ in accordance with a fixed decaying rate, recalculating an average distance $\{E_1'\}$ in accordance with the coordinate transformation $H_{min}$ and the decayed random perturbation control parameter σ, and judging whether the average distance $\{E_1'\}$ is smaller than or equal to the preset ideal average distance $E_x$;

step S308: if so, after decaying the random perturbation control parameter σ in accordance with the fixed decaying rate, reapplying the random perturbation to the image $\{p_i\}$, recalculating the average distance $\{E_1''\}$ by using the initial coordinate transformation $H_0$, and judging whether the average distance $\{E_1''\}$ is smaller than or equal to the preset ideal average distance E.

Step S305 and step S205 only differ in how to judge the magnitudes of the average distance $\{E_1\}$ and the initial average distance $E_0$. In step S205, the average distance $\{E_1\}$ is compared with the initial average distance $E_0$ in turn, and in step S305, the minimum average distance $E_{min}$ in the average distance $\{E_1\}$ is firstly selected, and then the minimum average distance $E_{min}$ is compared with the initial average distance $E_0$.

Embodiment 4

Figure 4:
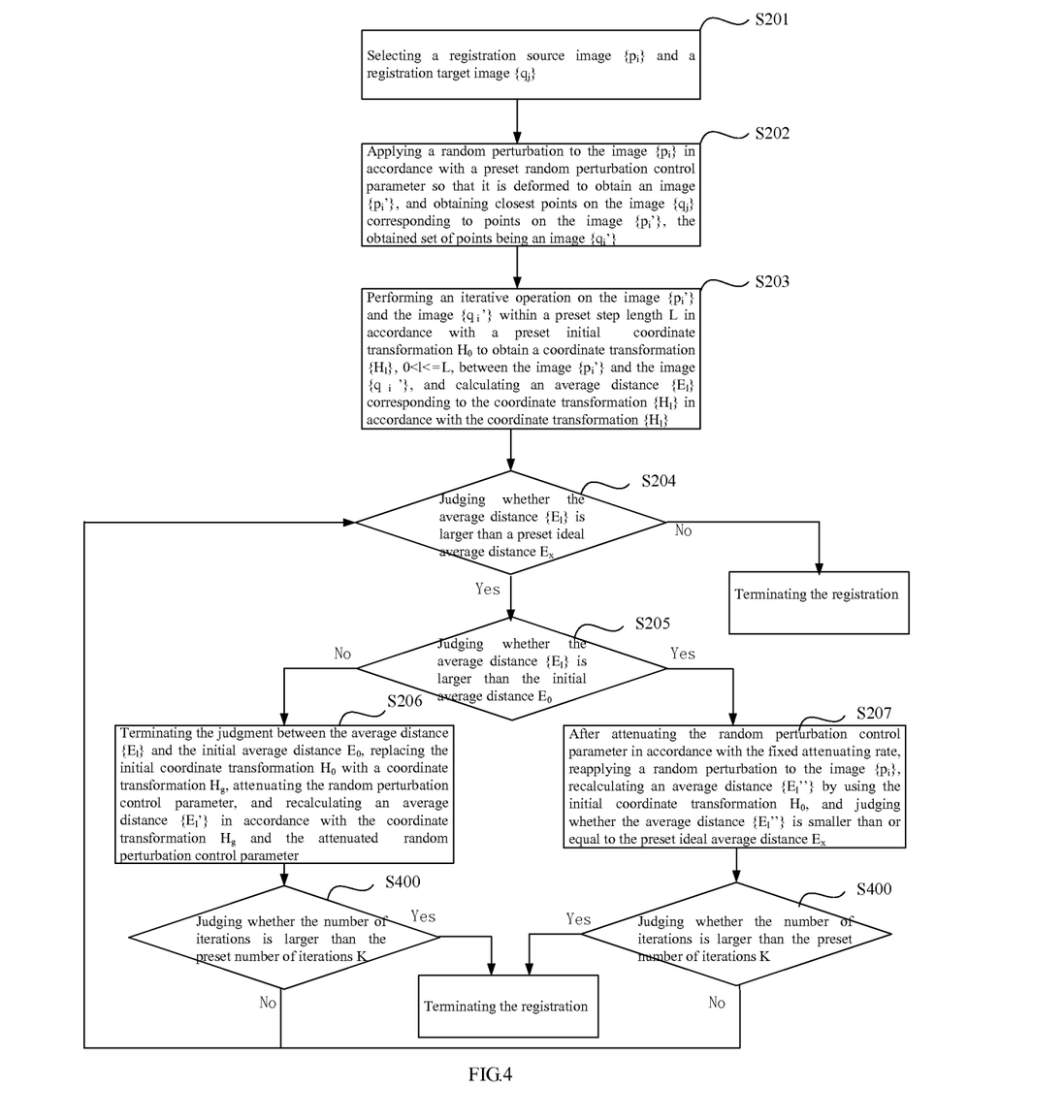
FIG. 4 is a schematic diagram of a flow of an image registration method provided in Embodiment 4 of the present application.
Figure 5:
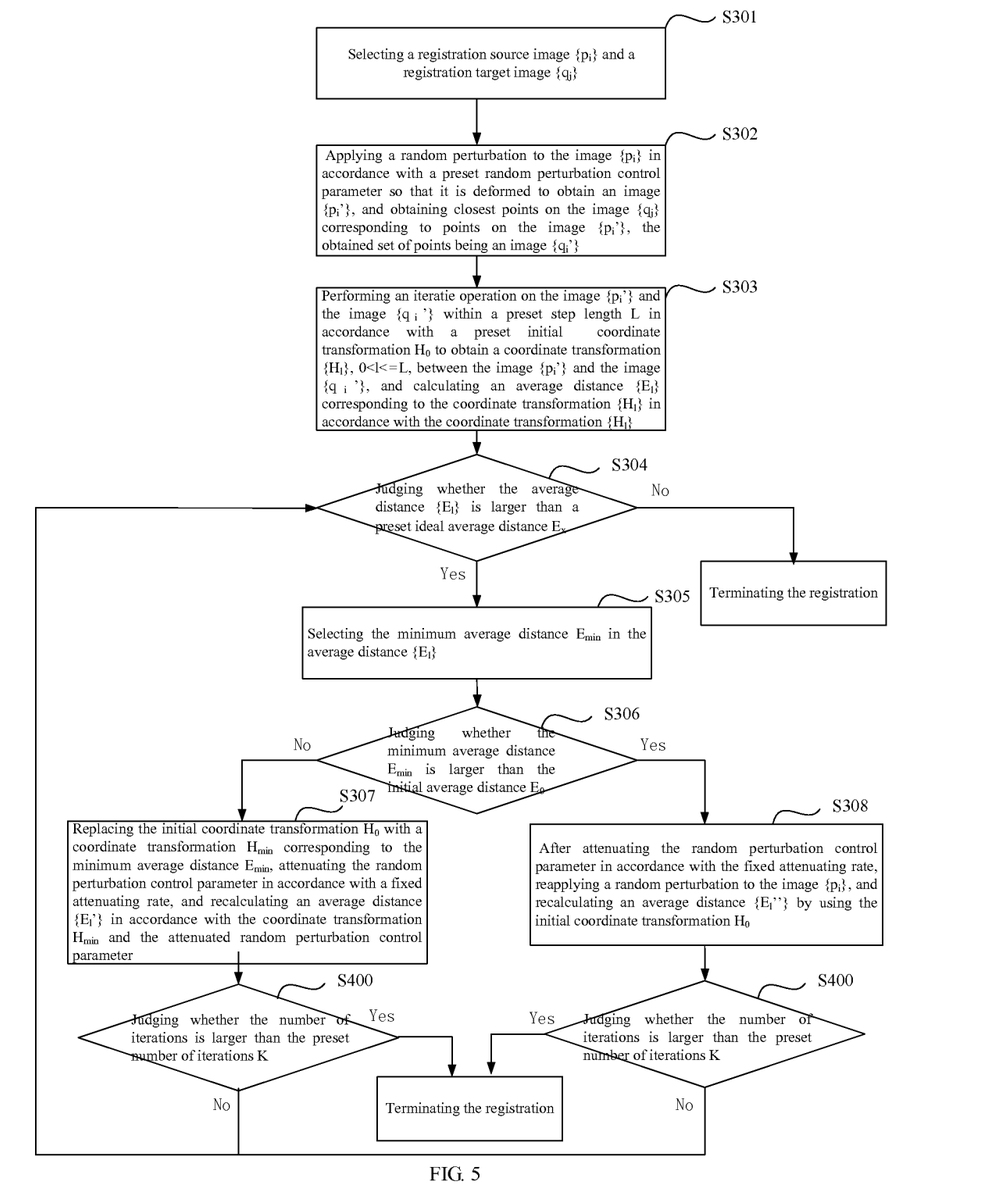
FIG. 5 is a schematic diagram of a flow of another image registration method provided in Embodiment 4 of the present application.

FIG. 4 is a schematic diagram of a flow of an image registration method provided in Embodiment 4 of the present application, and FIG. 5 is a flow of another image registration method provided in Embodiment 4 of the present application. As shown in FIG. 4 and FIG. 5, after step S206 or S207 of Embodiment 2, or after step S307 or S308 of Embodiment 3, this method can further comprise:

step S400: judging whether a number of iteration times is larger than a preset number of iteration times K, and if so, terminating the registration and reporting an error.

Presetting the number of iteration times K aims to control the iterations within a reasonable range to avoid waste of a large amount of time to perform the operation under the circumstance where the registration cannot be achieved. In the embodiment of the present application, the preset number of iteration times K is selected to be 100.

It can be seen from the above technical solutions provided in the embodiments of the present application that the random perturbation control parameter σ in this method can be decayed automatically in the whole iteration process, when the preset initial transformation is at the optimal starting position, there is no need to worry about a transformation of the model to a worse position due to adding the random perturbation, and when the initial transformation itself is not optimal, the model can be made to get rid of the bondage of local limits so as to be transformed to a better position to undergo the iteration by adding the random perturbation, i.e., approaching the global optimization by searching. Meanwhile, the random perturbation control parameter σ in this method is not set empirically but is comprehensively set after a consideration of the global search performance and the iteration speed, and with regard to multiple groups of cardiac chamber models, the random perturbation control parameters σ can be set to the same value, and all obtain a comparatively good registration effect.

Accordingly, the image registration method provided in the embodiments of the present application can not only achieve registration under a circumstance where a registration source and a registration target are in a large range of initial deviations, but also effectively get rid of bondage of local limits to improve registration accuracy and registration success rate without manual adjustment of parameters.

The above embodiments, which are only preferred embodiments of the present application, enable those skilled in the art to understand or implement the present application. Multiple amendments to these embodiments are obvious to those skilled in the art, and general principles defined in this context can be achieved in other embodiments within the spirit or scope of the present application. Therefore, the present application will not be limited to these embodiments shown in this context, but shall comply with the broadest scope consistent with the principles and novel characteristics disclosed in this document.

The invention claimed is:

1. An image registration method, comprising:
    selecting a registration source image $\{p_i\}$ obtained from a plurality of sensors in a cardiac chamber and a registration target image $\{q_j\}$ obtained from computed tomography imaging (CT), magnetic resonance imaging (MRI), or ultrasound, wherein $0<i<=M$, $0<j<=N$, i, j, M and N are positive integers, and $M<<N$, the registration source image $\{p_i\}$ and the registration target image $\{q_j\}$ being located in different coordinate systems;
    applying a random perturbation to each point in the image $\{p_i\}$ in accordance with a preset random perturbation control parameter σ so that it is deformed to obtain an image $\{p_i'\}$, and obtaining closest points on the image $\{q_j\}$ corresponding to points on the image $\{p_i'\}$, the obtained set of points being an image $\{q_i'\}$;

performing an iterative operation on the image $\{p_i'\}$ and the image $\{q_i'\}$ within a preset step length L in accordance with a preset initial coordinate transformation $H_0$ to obtain a coordinate transformation $\{H_I\}$, $0<I<=L$, between the image $\{p_i'\}$ and the image $\{q_i'\}$, and calculating an average distance $\{E_1\}$ between the image $\{p_i'\}$ and the image $\{q_i'\}$ in accordance with the coordinate transformation $\{H_I\}$, wherein the average distance $\{E_1\}$ corresponds to the coordinate transformation $\{H_1\}$;

judging magnitudes of the average distance $\{E_1\}$ and a preset ideal average distance $E_x$, and terminating the registration when the average distance $\{E_1\}$ is smaller than or equal to the preset ideal average distance, thus facilitating a comprehensive analysis of anatomic and physiological information to realize an improved diagnosis process.

2. The method according to claim 1, characterized in that the $p_i$ and $q_j$ are column vectors of 3*1.

3. The method according to claim 2, characterized in that said obtaining closest points on the image $\{q_j\}$ corresponding to points on the image $\{p_i'\}$ is specifically: searching for the closest points on the image $\{q_j\}$ corresponding to the points on the image $\{p_i'\}$ by means of KD binary tree.

4. The method according to claim 3, characterized in that said judging magnitudes of the average distance $\{E_1\}$ and the ideal average distance $E_x$ is specifically: judging in turn whether the average distance $\{E_1\}$ is smaller than or equal to the ideal average distance $E_x$.

5. The method according to claim 3, characterized in that said judging magnitudes of the average distance $\{E_1\}$ and the ideal average distance $E_x$ is specifically:
  selecting the minimum average distance $E_{min}$ in the average distance $\{E_1\}$;
  judging magnitudes of the minimum average distance $E_{min}$ and the ideal average distance $E_x$.

6. The method according to claim 1, characterized by, when the average distance $\{E_1\}$ is larger than the preset ideal average distance, further comprising steps of:
  judging in turn magnitudes of the average distance $\{E_1\}$ and an initial average distance $E_0$, wherein the initial average distance $E_0$ is corresponding to the initial coordinate transformation $H_0$;
  when any value in the average distance $\{E_1\}$ is smaller than or equal to the initial average distance $E_0$, terminating the judgment between the average distance $\{E_1\}$ and the initial average distance $E_0$, replacing the initial coordinate transformation $H_0$ with a coordinate transformation $H_g$ corresponding to a current average distance $E_g$, decaying the random perturbation control parameter σ in accordance with a fixed decaying rate, recalculating an average distance $\{E_1'\}$ in accordance with the coordinate transformation $H_g$ and the decayed random perturbation control parameter σ, and judging whether the average distance $\{E_1'\}$ is smaller than or equal to the preset ideal average distance $E_x$;
  when all the values in the average distance $\{E_1\}$ are larger than the initial average distance $E_0$, after decaying the random perturbation control parameter σ in accordance with the fixed decaying rate, reapplying a random perturbation to the image $\{p_i\}$, recalculating an average distance $\{E_1''\}$ by using the initial coordinate transformation $H_0$, and judging whether the average distance $\{E_1''\}$ is smaller than or equal to the preset ideal average distance $E_x$.

7. The method according to claim 1, characterized by, when the average distance $\{E_1\}$ is larger than the preset ideal average distance, further comprising steps of:
  selecting the minimum average distance $E_{min}$ in the average distance $\{E_1\}$;
  judging magnitudes of the minimum average distance $E_{min}$ and the initial average distance $E_0$, wherein the initial average distance $E_0$ is corresponding to the initial coordinate transformation $H_0$;
  when the minimum average distance $E_{min}$ is smaller than or equal to the initial average distance $E_0$, replacing the initial coordinate transformation $H_0$ with a coordinate transformation $H_{min}$ corresponding to the minimum average distance $E_{min}$, decaying the random perturbation control parameter σ in accordance with a fixed decaying rate, recalculating an average distance $\{E_1'\}$ in accordance with the coordinate transformation $H_{min}$ and the decayed random perturbation control parameter σ, and judging whether the average distance $\{E_1'\}$ is smaller than or equal to the preset ideal average distance $E_x$;
  when the minimum average distance $E_{min}$ is larger than the initial average distance $E_0$, after decaying the random perturbation control parameter σ in accordance with the fixed decaying rate, reapplying a random perturbation to the image $\{p_i\}$, recalculating an average distance $\{E_1''\}$ by using the initial coordinate transformation $H_0$, and judging whether the average distance $\{E_1''\}$ is smaller than or equal to the preset ideal average distance $E_x$.

8. The method according to claim 6, characterized by, after said recalculating an average distance $\{E_1'\}$ or recalculating an average distance $\{E_1''\}$, further comprising:
  judging whether a number of iteration times is larger than a preset number of iteration times K, and
  terminating the registration and reporting an error when the number of iteration times is larger than the preset number of iteration times K.

9. The method according to claim 6, characterized in that the fixed decaying rate of the random perturbation control parameter σ is $$\frac{1}{\sqrt{2}}.$$

10. The method according to claim 1, characterized in that the step length L is in a range of 50~200.

* * * * *